US007818477B2

(12) United States Patent
Toyama et al.

(10) Patent No.: US 7,818,477 B2
(45) Date of Patent: Oct. 19, 2010

(54) STORAGE DEVICE WITH BUFFER CONTROL UNIT

(75) Inventors: Masayuki Toyama, Osaka (JP); Masahiro Nakanishi, Kyoto (JP); Tomoaki Izumi, Osaka (JP); Tetsushi Kasahara, Osaka (JP); Kazuaki Tamura, Osaka (JP); Kiminori Matsuno, Osaka (JP); Manabu Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 11/909,749

(22) PCT Filed: Mar. 24, 2006

(86) PCT No.: PCT/JP2006/305964

§ 371 (c)(1),
(2), (4) Date: Dec. 5, 2007

(87) PCT Pub. No.: WO2006/104036

PCT Pub. Date: Oct. 5, 2006

(65) Prior Publication Data

US 2009/0019194 A1 Jan. 15, 2009

(30) Foreign Application Priority Data

Mar. 28, 2005 (JP) ............................. 2005-091930

(51) Int. Cl.
*G06F 3/00* (2006.01)
*G06F 13/00* (2006.01)
*G06F 1/00* (2006.01)
*G06F 11/00* (2006.01)

(52) U.S. Cl. ......................... 710/52; 711/100; 711/156; 713/340; 714/1; 714/6; 714/15

(58) Field of Classification Search ................... 710/52; 713/300, 340; 714/1–3, 5–7, 9, 15, 18–20, 714/22, 24, 100; 711/100–103, 106, 154, 711/156
See application file for complete search history.

(56) References Cited

U.S. PATENT DOCUMENTS 5,519,831 A * 5/1996 Holzhammer ................. 714/22

(Continued)

FOREIGN PATENT DOCUMENTS

JP          64-076346         3/1989

(Continued)

OTHER PUBLICATIONS

English language Abstract of JP 11-143788.

(Continued)

*Primary Examiner*—Alford W Kindred
*Assistant Examiner*—Richard Franklin
(74) *Attorney, Agent, or Firm*—Greenblum & Bernstein, P.L.C.

(57) ABSTRACT

When a control unit (160) in a storage device (100) detects that a write end command or a data amount to be written has been transmitted from a host device (110), the control unit (160) saves control information required for writing data in a control information save memory (142). The control unit (160) also saves data which has not been written in storage medium into a buffer save memory (152) from a data buffer (151) and releases the busy state for the host device (110). The control unit (160) writes the saved data into a storage medium (120). Even if the power is turned OFF before completion of write, write can be performed into the storage medium (120) by using the saved data when the power is turned ON next time.

16 Claims, 11 Drawing Sheets

U.S. PATENT DOCUMENTS

| | | | |
|---|---|---|---|
| 5,596,708 A * | 1/1997 | Weber | 714/6 |
| 5,799,200 A * | 8/1998 | Brant et al. | 713/340 |
| 6,289,416 B1 * | 9/2001 | Fukushima et al. | 711/113 |
| 6,693,840 B2 * | 2/2004 | Shimada et al. | 365/228 |
| 6,862,673 B2 * | 3/2005 | Lee et al. | 711/169 |
| 7,380,055 B2 * | 5/2008 | Ashmore | 711/112 |

FOREIGN PATENT DOCUMENTS

| | | |
|---|---|---|
| JP | 7-200418 | 8/1995 |
| JP | 10-154101 | 6/1998 |
| JP | 11-143788 | 5/1999 |

OTHER PUBLICATIONS

English language Abstract of JP 64-076346.
English language Abstract of JP 7-200418.
English language Abstract of JP 10-154101.

* cited by examiner

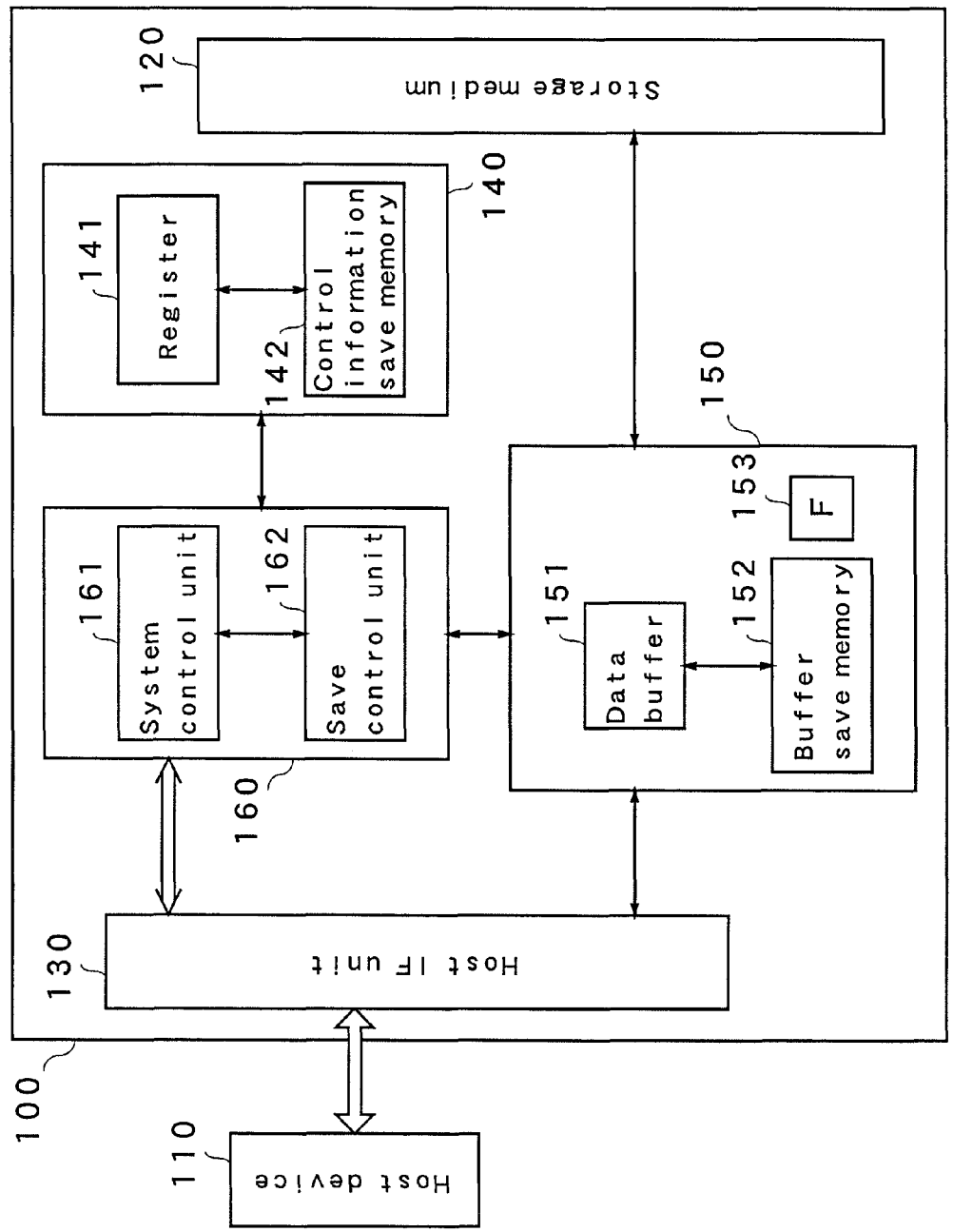

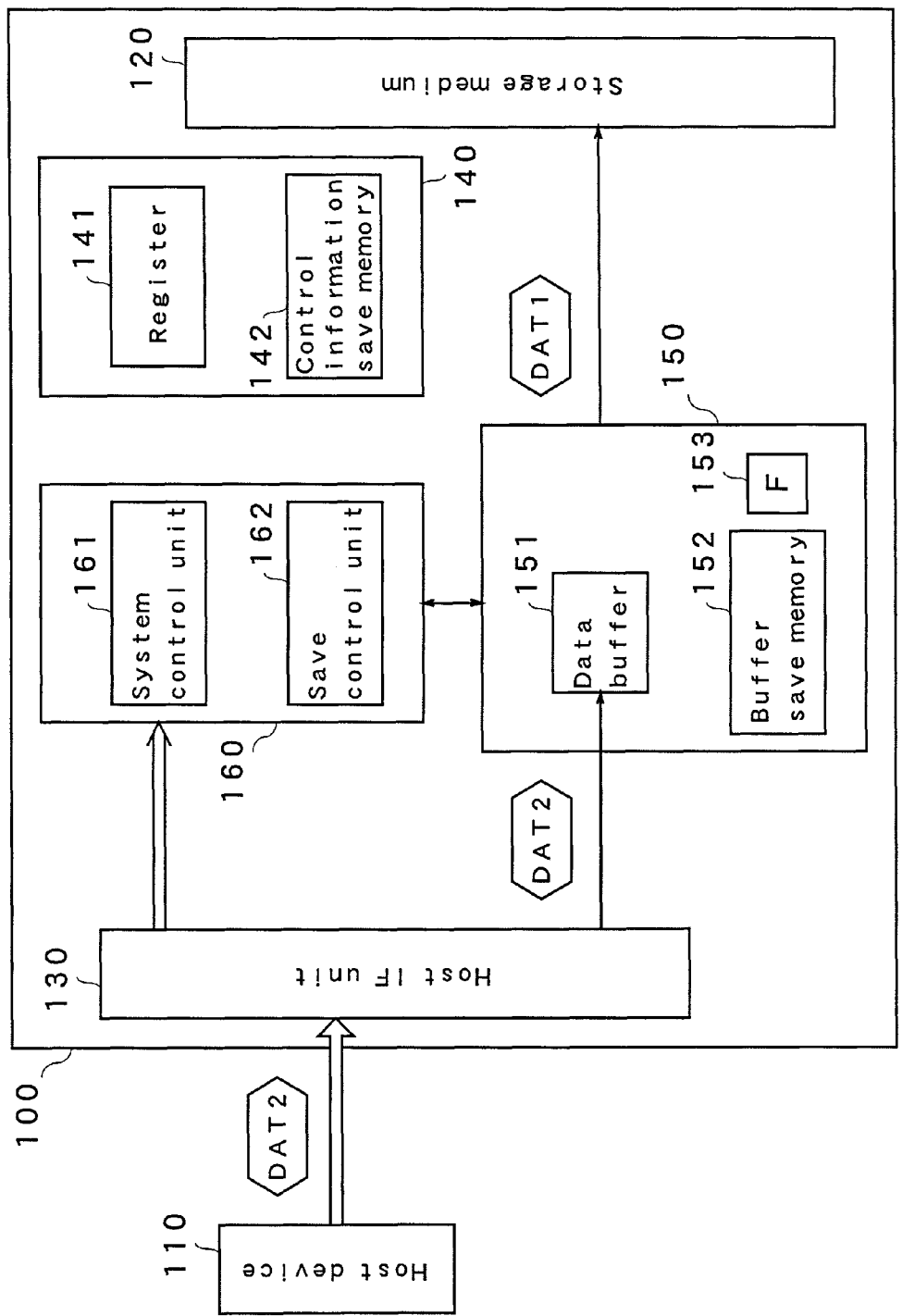

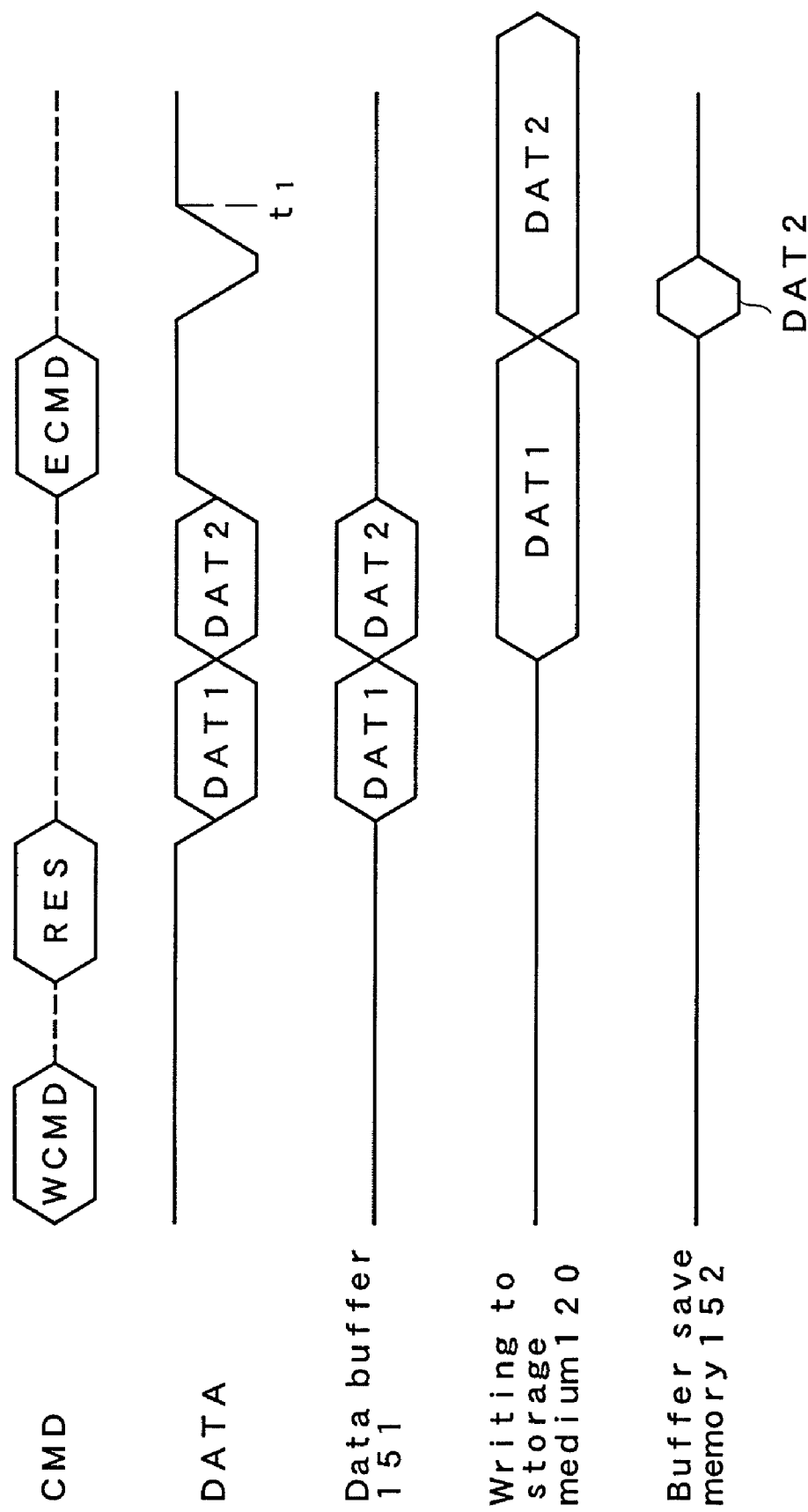

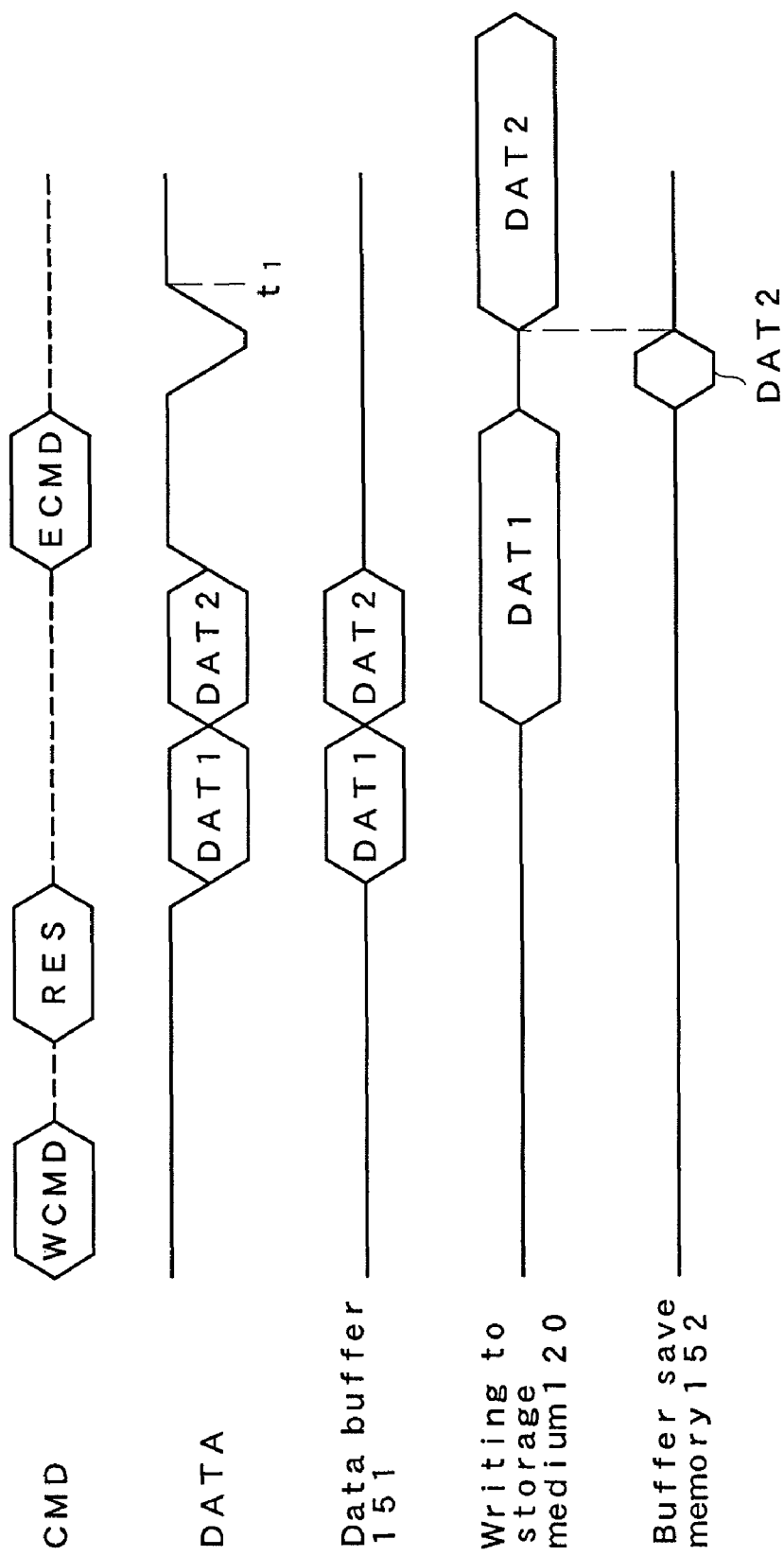

STORAGE DEVICE WITH BUFFER CONTROL UNIT

TECHNICAL FIELD

The present invention relates to a storage device including a nonvolatile memory.

BACKGROUND ART

In an apparatus for controlling digital data (hereinafter referred to as a host device) such as a digital camera, movie, portable music player, and the like, as a storage device for retaining digital data, there is a memory card mounting a nonvolatile memory. As a nonvolatile memory used by the memory card, a flash memory is commonly used. Since the storage device is kept in a busy state, seen from the host apparatus, until completion of writing to the flash memory because the flash memory takes long time for writing, the host device cannot be free from the storage device. In addition, if the power is shut down during the writing, a state of a memory cell in being written is not assured. In Patent document 1, a method, including a faster nonvolatile memory compared to the flash memory, for writing data to the faster nonvolatile memory when the power failure is detected during the writing to the flash memory.

Patent document 1: Japanese Unexamined Patent Publication No. Hei 11-143788.

DISCLOSURE OF THE INVENTION

Problems to be Solved by the Invention

However, aforementioned conventional technique has a following problem. Since the faster nonvolatile memory is used only when the power failure is detected, the problem that takes much time, seen from the host device, until completion of data writing when the power is applied cannot be solved.

In consideration of the problem, the present invention intends to provide a storage device which realizes improvement of performance seen from the host device when the power is applied.

Means to Solve the Problems

To solve the problems, a storage device of the present invention comprises: a storage medium composed of a nonvolatile memory for storing data; a buffer control unit including a data buffer for temporarily retaining data to be written transmitted from a host device and a nonvolatile buffer save memory for saving data of said data buffer; and a control unit for controlling said buffer control unit, wherein said control unit saves write data retained in said data buffer into said buffer save memory and stores the write data in said storage medium based on information regarding the write data obtained from said host device, and informs said host device of completion of writing after completion of saving the data.

Here, the information regarding the write data obtained from said host device may be information showing a termination of data writing.

Here, the information regarding the write data obtained from said host device may be information showing a preliminarily specified data size.

Here, said control unit may include a voltage detection unit for detecting dropping of the power voltage, and said control unit may save the write data retained in said data buffer into said buffer save memory when dropping of the power voltage is detected by said voltage detection unit during writing the write data transmitted from said host device into said storage medium.

Here, said storage device may further comprise:

a control information retaining unit for retaining control information including address information provided from the host device and information for writing data into said storage medium, wherein said control information retaining unit may include: a register for temporarily retaining the control information; and a nonvolatile control information save memory for saving information of said register, wherein said control unit may save the control information retained in said register into said control information save memory when saving said writing data into said buffer save memory.

Here, said control information may include information of writing area address in said storage medium.

Here, said control information save memory may be a nonvolatile memory in which data can be written faster than said storage medium.

Here, said control information save memory may be composed of a ferroelectric memory.

Here, said buffer save memory may be a nonvolatile memory in which data can be written faster than said storage medium.

Here, said buffer save memory may be composed of a ferroelectric memory.

Here, said storage device may further comprise a nonvolatile save flag set when data is saved in said buffer save memory, wherein said control unit may set said save flag when data is saved into said buffer save memory, and clear the save flag when writing of said saved data into said storage medium is completed.

Here, said storage device may comprise a nonvolatile save flag set when information of said register is saved into the control information save memory, wherein said control unit may set said save flag when control information of the register is saved into said control information save memory, and clear the save flag when writing of data into said storage medium is completed with using said saved control information.

Here, said storage device may further comprise a nonvolatile save flag, wherein said control unit may set said save flag when data is saved into said buffer save memory and said control information is saved into said control information save memory, and clear the save flag when writing of data into said storage medium is completed with using said saved control information.

Here, said buffer save memory and said control information save memory may be configured in the same nonvolatile memory, data may be saved into buffer save areas, and the control information may be saved into control information save area, respectively.

Here, said control unit may read said save flag at the time when the power is supplied, write said write data retained in said data save buffer into said storage medium when said save flag is set, and clear said save flag when writing is completed.

Here, said control unit may read said save flag at the time when the power is supplied, confirm a size of data of writing data retained in said data save buffer when said save flag is set, write the data into said storage medium in predetermined unit, and discard data retained in said data save buffer when a size of remaining writing data is less than a predetermined size.

Here, said save flag may be integrally configured with said buffer save memory.

EFFECTIVENESS OF THE INVENTION

According to the present invention, since necessary data and/or control information are/is recorded in a saved data retaining unit when data transmission from a host device finishes, time before data writing, seen from the host device, can be shortened and writing performance can be improved when the power is applied. In addition to this effectiveness, since the invention including a voltage detection unit and a control information retaining unit saves necessary data even when dropping of the power voltage is detected, a storage device with a high immunity to the power shut-down can be provided.

BRIEF DESCRIPTION OF DRAWINGS

FIG. 1 is a block diagram to explain a configuration of a storage device according to a first embodiment of the present invention.

FIG. 2C is a block diagram to explain the data writing flow in the storage device according to the embodiment of the present invention.

FIG. 3A is a timing chart to explain the data writing flow, seen from a host device, of the storage device according to the embodiment of the present invention.

FIG. 3B is a timing chart to explain another data writing flow, seen from a host device, of the storage device according to the embodiment of the present invention.

EXPLANATION OF REFERENCE NUMERALS

Figure 2A:
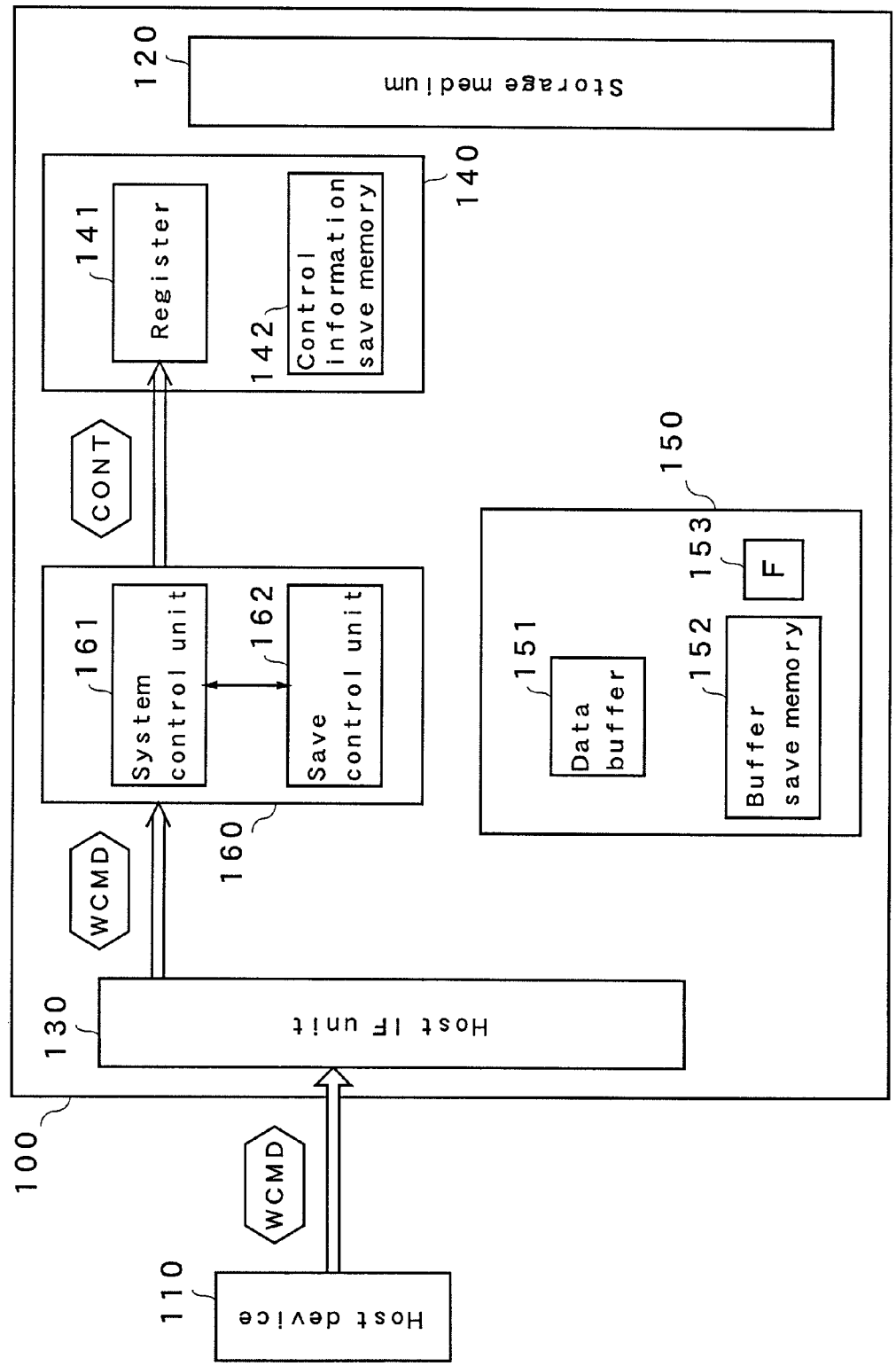
FIG. 2A is a block diagram to explain a data writing flow in the storage device according to the embodiment of the present invention.

100 Storage device
110 Host device
120 Storage medium
140 Control information retaining unit
141 Register
142 Control information save memory
150 Buffer control unit
151 Data buffer
152 Buffer save memory
153 Save flag
160 Control unit
161 System control unit
162 Save control unit
163 Voltage detection unit

BEST MODE FOR CARRYING OUT THE INVENTION

First Embodiment

FIG. 1 is a block diagram showing a configuration of a storage device according to a first embodiment of the present invention. A storage device 100 is connected to a host device 110, writes data after receiving a command (CMD) and data (DATA) from the host device 110, and reads the data to output the data to the host device 110. The storage device 100 is configured by including a storage medium 120 for retaining data, a host IF unit 130 for executing transmission control with the host device, a control information retaining unit 140 for retaining control information corresponding to the control by the host device 110, a buffer control unit 150 for temporarily retaining data read and written by the host device 110, and a control unit 160. The control unit 160 controls the host IF unit 130, the control information retaining unit 140, and the buffer control unit 150. The storage medium 120 is a memory for retaining user data, and is composed of, for example, a nonvolatile memory such as a NAND type flash memory.

The control information retaining unit 140 is configured by including a register 141 and a control information save memory 142. The register 141 is a buffer for retaining, for example, logical address information transmitted form the host device 110 and control information such as a block during being written to the storage medium 120, and the control information save memory 142 is a nonvolatile memory for temporarily saving this information. The register 141 may be composed of a nonvolatile RAM. In addition, the control information save memory 142 is preferably a nonvolatile memory which can be written with higher rate than that of the storage medium 120, for example, a ferroelectric memory.

Next, the buffer control unit 150 includes a data buffer 151, a buffer save memory 152, and a save flag (F) 153. The data buffer 151 is a volatile memory such as a SRAM. It is enough for a size of the data buffer to be an integral multiplication of a transmission unit of data transmitted from the host device 110, for example, 512 bytes. In addition, the buffer save memory 152 is composed of a nonvolatile memory. The buffer save memory 152 is preferably a memory which can be written with higher rate than that of the storage medium 120, for example, a ferroelectric memory. It is enough for a size of the buffer save memory 152 to be an integral multiplication of a transmission unit of data transmitted from the host device 110, be the same size of the data buffer 151, or be different size. The size is preferably equal to or less than that of the buffer memory since the nonvolatile buffer save memory 152 is more expensive and has the smaller number for rewriting than those of the volatile data buffer 151. The save flag 153 is a nonvolatile flag showing existence of saved data when the data is saved into the buffer save memory 152. The save flag 153 may be composed of a nonvolatile memory in integrating with the buffer save memory 152.

The control unit 160 includes a system control unit 161 and a save control unit 162. The system control unit 161 controls the host IF unit 130, the buffer control unit 150, and the control information retaining unit 140 depending on a transmission request from the host device 110, and executes data transmission to the storage device 120. The save control unit 162 controls saving and restoring processes for write data and control information, and controls a response to the host.

Using FIG. 2A to FIG. 2D, FIG. 3A, and FIG. 3B, a writing sequence in the storage device 100 according to the first embodiment will be described below. A case where DAT1 and DAT2, two units of data, are written will be explained in the present embodiment, however, an applicable scope of the present invention is not limited to the case.

In FIG. 2A, the host device 110 issues a writing command WCMD to the storage device 100. The command includes a transmission type such as reading or writing, an address of transmitted data, and the like. The command is transmitted to the control unit 160 after being received by the host IF unit 130. In the control unit 160, an address and a type of reading or writing are retrieved from contents of the command as control information shown as "CONT" in the drawing, and are retained in the register 141 of the control information retaining unit 140.

FIG. 3A and FIG. 3B are time charts in the case of seeing from the host device. In the drawings, the CMD shows a state of a signal line for the host device and the storage device 100 to mutually exchange the control information of a command and a response, the DATA shows a state of a signal line for the host device and the storage device 100 to transmit write data. Synchronizing with this timing, writing to the data buffer 151 and the storage medium 120 and writing to the save buffer 152 are shown.

In FIG. 3A, when the host device issues the writing command WCMD, the storage device 100 transmits a command response RES showing reception of the command to the host device.

Figure 2B:
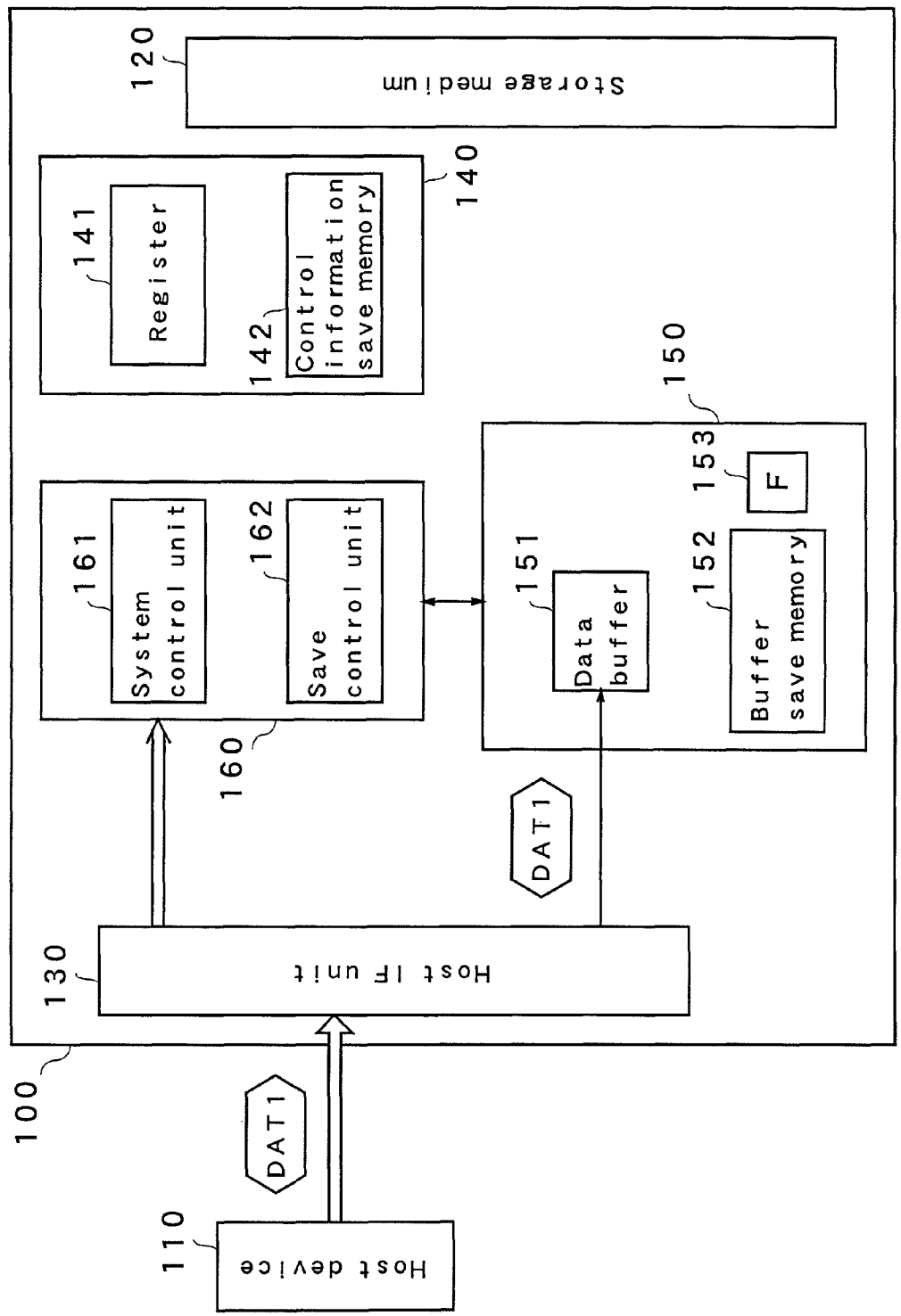
FIG. 2B is a block diagram to explain the data writing flow in the storage device according to the embodiment of the present invention.

The host device transmits write data to the storage device 100 after receiving the command response RES. In FIG. 2B, when the host device 110 transmits the write data DAT1, the host IF unit 130 receives the write data DAT1. The control unit 160 stores the data DAT1 in the data buffer 151 of the buffer control unit 150.

Subsequently, in FIG. 2C, the host device 110 transmits the write data DAT2. The host IF unit 130 receives the write data DAT2. The control unit 160 stores the received data DAT2 in the data buffer 151 of the buffer control unit 150. At the same time, the write data DAT1 stored in the data buffer 151 is written into the storage medium 120.

Figure 2D:
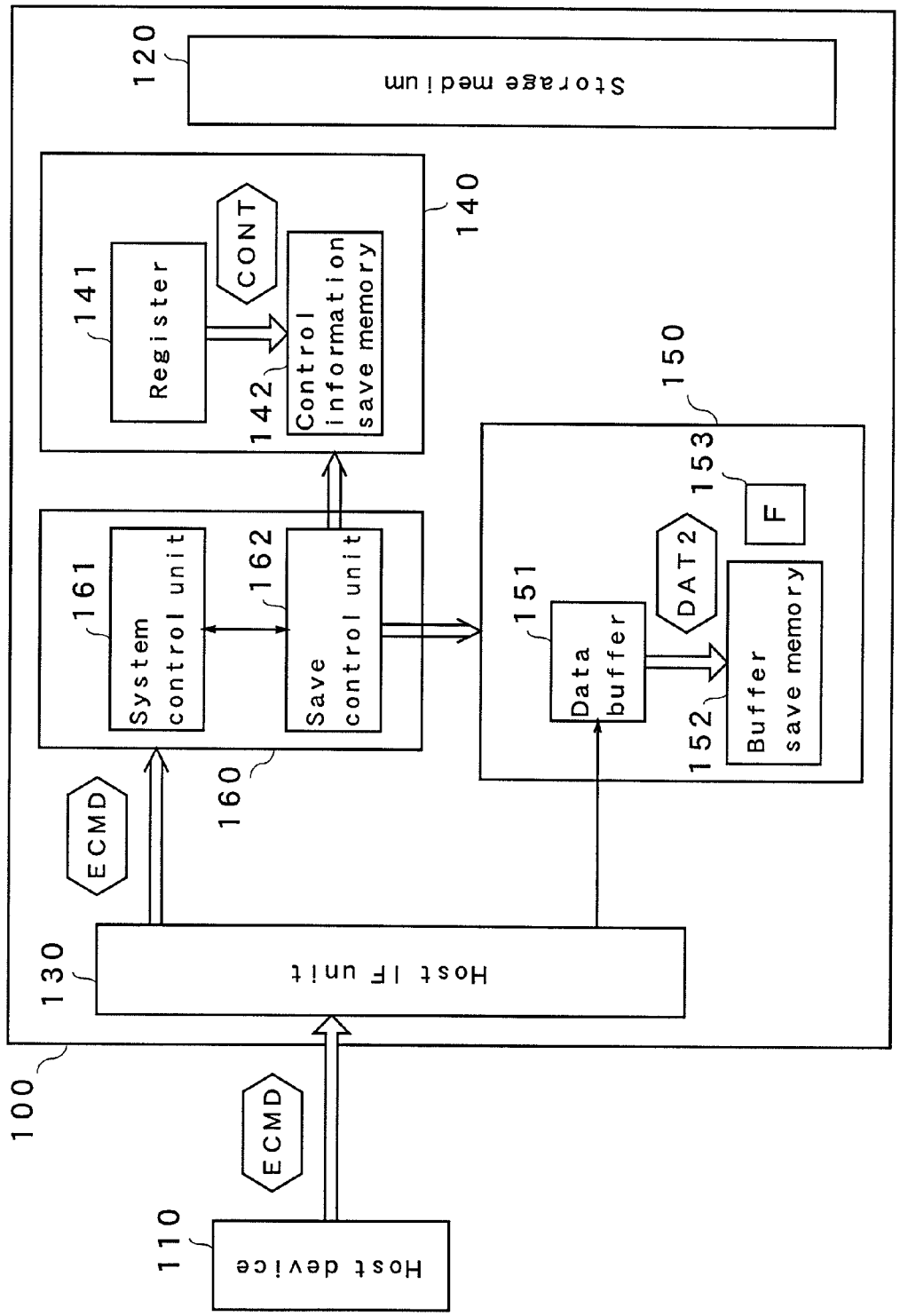
FIG. 2D is a block diagram to explain the data writing flow in the storage device according to the embodiment of the present invention.

In FIG. 2D and FIG. 3A, the host device 110 issues an end command ECMD to the storage device 100. After receiving this command, the host IF unit 130 transmits the command to the control unit 160. In the control unit 160, when receiving the end command, the save control unit 162 generates a save signal, and transmits the save signal to the buffer control unit 150 and the control information storage unit 140. Accordingly, in the present embodiment, the save signal is generated based on the end command for writing as information regarding writing data obtained from the host device 110. In the buffer control unit 150, when receiving the save signal, data during writing stored in the data buffer 151 is saved into the buffer save memory 152. In the control information retaining unit 140, when receiving the save signal, control information (CONT) such as logical addresses and writing blocks stored in the register 141 from the host is saved into the control information save memory 142. At least, the control information (CONT) can be information showing logical address of the data and physical address in which data is to be written (information of writing area address) as data writing. Although, only the data DAT2 during writing is saved in the present embodiment, if the size of the data buffer is enlarged, data whose size is equal to or more than that of the buffer save memory 152 exists in the data buffer 151. In this case, with saving data into the buffer save memory 152, data writing is continued to data which is not saved yet, after that, saving can be deemed to be completed at the time when all the writing data in the data buffer 151 are in a safe state.

In FIG. 3A, with continuing data writing to the storage medium 120 even after receiving the end command ECMD, data is saved into the buffer save memory 152. In place of this method, as shown in FIG. 3B, when receiving the end command ECMD, a data line may be set to be free by saving data into the buffer save memory 152. After this, as shown in FIG. 3B, data is written from the data buffer 151 to the storage medium 120. In any of these cases, data is saved into the buffer save memory after receiving the end command ECMD.

When writing data and control information are saved, the save flag 153 in the buffer control unit 150 is set. The "setting" of the save flag shows existence of data saved in the buffer save memory 152 and the control information save memory 142. The save flag 153 is provided in the buffer control unit 150 in the embodiment of the present invention, however, save flags for respectively showing data saving may be provided in both of the control information retaining unit 140 and the buffer control unit 150, or the same flag may be provided only in the control information retaining unit 140. When the save flag is provided to either of them, a necessary resource can be reduced.

When receiving the end command ECMD, the storage device 100 is in a busy state by using the DATA line. The "busy state" shows that writing data is processed in the storage device 100, and, in the present embodiment, a case where the DATA line is in low shows that the storage device 100 is in the busy state. During this moment, the writing data DAT2 and control information are saved into the storage device 100 as explained using FIG. 2D. Upon completion of the saving, the control unit 160 restores the DATA line to be from in busy state to in normal state, hereby, informs completion of data writing to the host device 110. The host device 110 can recognize the completion of data writing at timing t1 when the DATA line becomes high. Since one writing is completed in about 1 microsecond when a ferroelectric memory, for example, is used for the buffer save memory 152 and the control information save memory 142, time in busy state can be shortened. That is to say, time until completion of data writing, seen from the host device 110, can be shortened, and processing performance of the storage device can be improved.

After that, the storage device 100 continues writing of data retained in the data buffer 151 to the storage medium 120 by using saved data or control data retained in the register 141, and completes the writing processing. Upon writing the DAT2 of the data buffer 151 into the storage medium 120, the save control unit 162 clears the save flag 153. The "clearing" of the save flag 153 shows nonexistence of saved data in the buffer save memory 152 and the control information save memory 142. However, the power may be shut down by the time of completion of writing because the busy state cannot be found seen from the host device 110 side. Since data to be written is retained in the buffer save memory 152, control information necessary for writing is also retained in the control information save memory 142, and these are nonvolatile memories, the contents are retained even if the power is shut down. Accordingly, writing processing of data retained in the buffer save memory 152 is restarted at the next power-on. This processing will be described.

Figure 4:
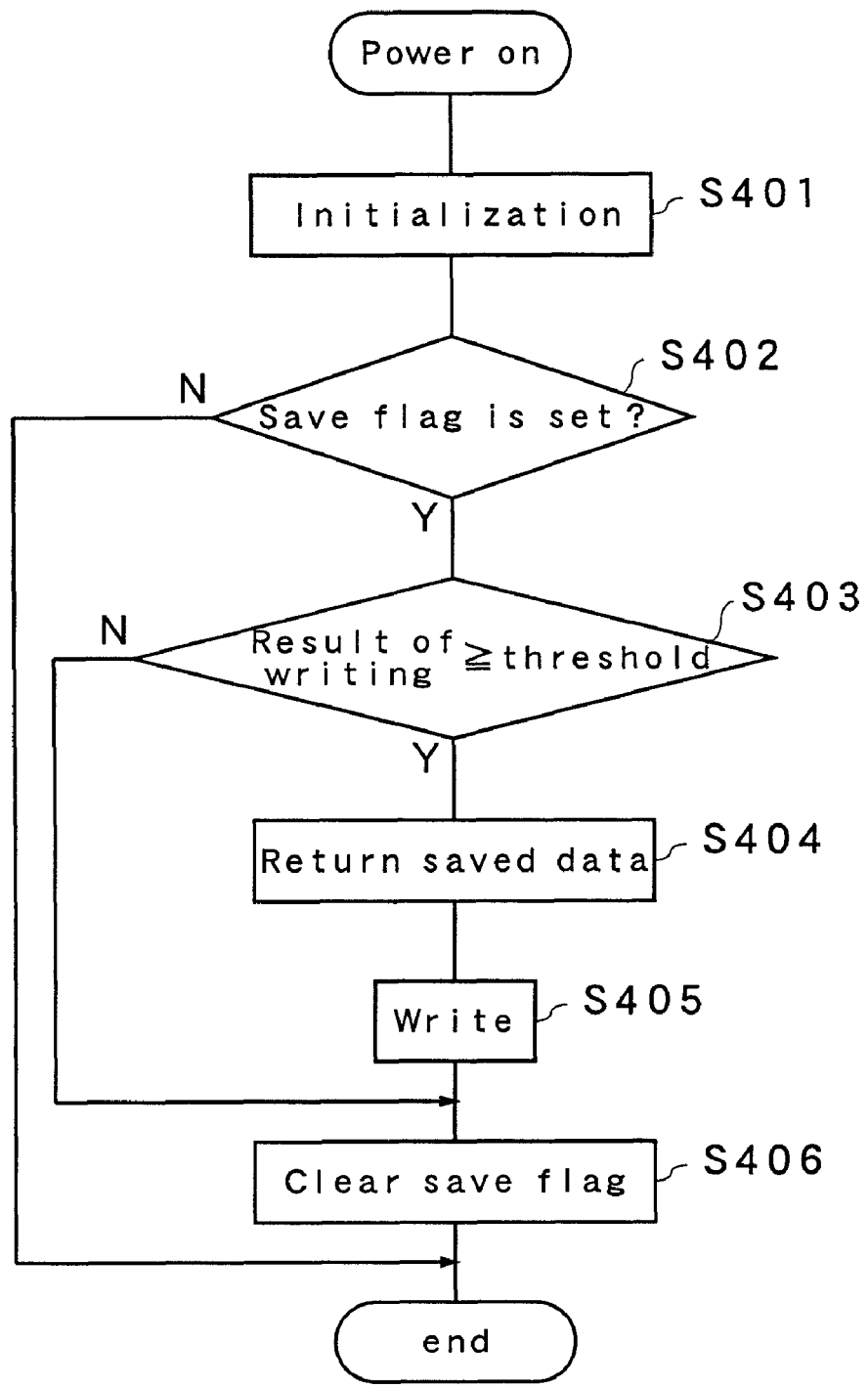
FIG. 4 is a flowchart to explain processing in a timing of a power supply of the storage device according to the embodiment of the present invention.

FIG. 4 is a control flow executed by the control unit 160 in the storage device 100 when the power is supplied to the storage device 100. In FIG. 4, the control unit 160 executes initialization processing when the power is supplied (S401). In the initialization processing, the control unit 160 checks a bad block in the storage medium 120 and creates a table for converting a logical address issued by the host device into a physical address of the storage medium 120. While the initialization processing is executed at the power-on in the present embodiment, the processing may be executed when an initialization command is issued from the host device.

When the initialization processing is completed, the control unit 160 confirms whether the save flag 153 is set or not (S402). If the flag is set, a size of the saved data is checked (S403). Data reading and writing from the host device 110 is usually performed in a unit called a cluster by using a file system. A size of the cluster is, for example, 16 kB. In a case where a cluster cannot be constituted when the saved data is written into the storage medium 120 again, the data may be meaningless for the host device. For this reason, it is determined whether to process the saved data on the basis of a threshold showing whether one cluster can be constituted in the storage medium 120 by writing saved data to the storage medium 120, for example. The threshold may be specifically determined in the storage device 100, and may be able to be set by the host device. When resultant data size after writing the saved data is equal to or more than the threshold, restoring processing of the saved data is executed (S404). The restoring processing shows a processing for transferring write data retained in the buffer save memory 152 into the data buffer 151 and a processing for transferring the control information retained in the control information save memory 142 into the register 141. After executing the restoring processing, write data in the data buffer 151 is written into the storage medium 120 (S405). Upon completion of the writing, the save flag is cleared (S406), and the processing is completed. When the save flag is not set in S402, the processing is finished. In addition, when data size is less than the threshold at S403, the save flag is cleared (S406), and the processing is completed. Accordingly, the saved data is discarded. Also in a case where data less than a threshold remains at S405, the data is discarded. After restoring the saved data to the data buffer 151 once and restoring the control information saved in the control information save memory 142 to the register 141 once, and then writing is performed, however, the restoring processing may be omitted with performing writing to the storage medium 120 directly by using contents of the control information save memory 142 and the buffer save memory 152.

With these processing, even when the power shutdown occurs during writing, interrupted processing can be completed when the power is supplied again, thus a highly reliable storage device can be provided. In this case, since the non-volatile buffer save memory has the smaller number of rewriting and is highly cost than those of the volatile memory such as a SRAM, a highly reliable storage device can be realized with reducing the number of using the buffer save memory by writing to the buffer save memory only when the host device informs a completion of writing.

Second Embodiment

A second embodiment of the present invention will be described. An entire configuration of the present embodiment is the same as the case of FIG. 1. In this embodiment, the host device issues a writing command after informing a size of data to be transmitted to the storage device preliminarily. In this embodiment, after receiving data of the size preliminarily informed, the storage device retains unwritten data in the data buffer 151 into the buffer save memory 152 and retains control information in the register 141 into the control information save memory 142, and then the storage device sets the save flag 153. This can release a busy state immediately after the completion of the save and can set the host device free quickly. As a result, in the present embodiment, a save signal is generated based on the size of data informed as information regarding writing data provided from the host device 110.

Also in this case, unwritten data retained in the data buffer 151 is written into the storage medium 120 by using control information of the register 141, subsequently. In addition, it is similar to the first embodiment described above that when the power is shut down by completion of this processing, data retained in the buffer save memory 152 is written in the storage medium 120 by using control information retained in the control information save memory 142 after the next power supply.

Third Embodiment

Figure 5:
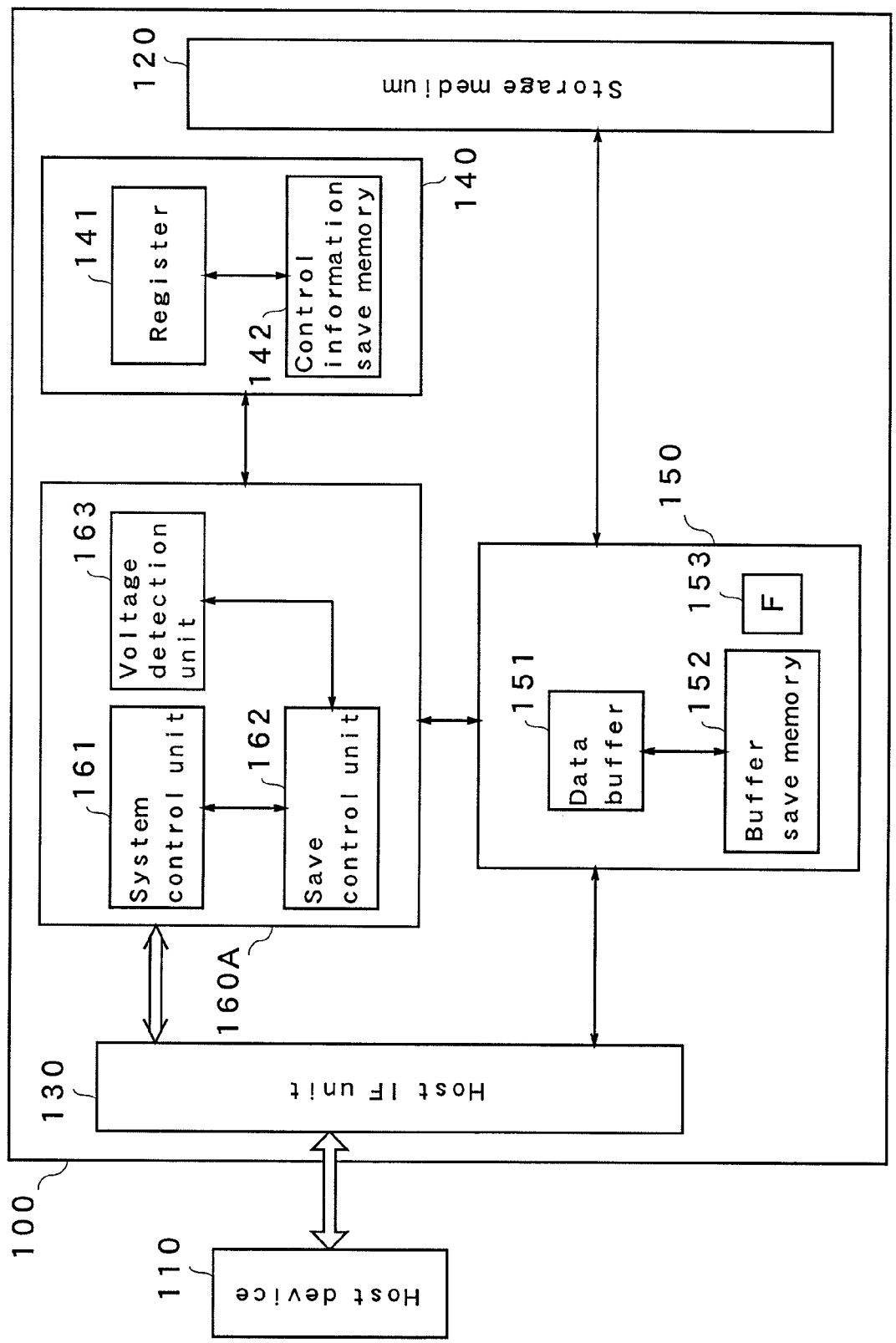
FIG. 5 is a block diagram showing a configuration of a storage device according to a third embodiment of the present invention.

A third embodiment of the present invention will be described. In the present embodiment, in addition to features of the first embodiment or the second embodiment, the save processing is executed even when the power voltage drops. FIG. 5 is a block diagram showing a configuration of a storage device according to the present embodiment. Concerning the same part as those of the first embodiment, the present embodiment omits detailed description by appending the same numerals. In this embodiment, a control unit 160A includes a voltage detection unit 163 for detecting the power voltage in addition to the aforementioned system control unit 161 and the save control unit 162. The voltage detection unit 163 detects voltage level applied to the storage device 100, and generates a reset signal and a voltage dropping detection signal. Other components are the same as those of the first embodiment described above.

Figure 6:
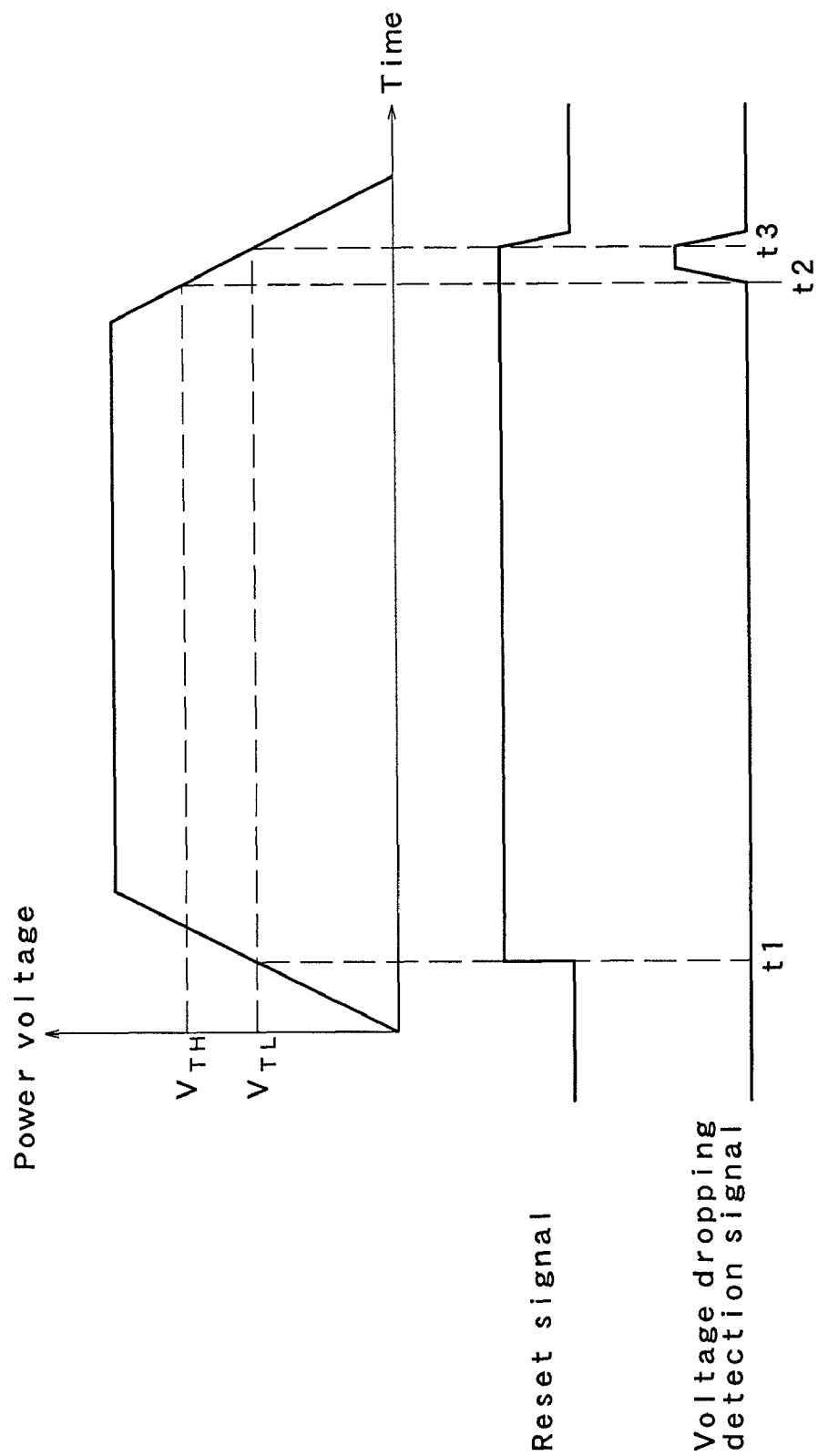
FIG. 6 is a timing chart to explain an operation of a voltage detection unit according to the third embodiment of the present invention.

FIG. 6 is a view for explaining an operation of the voltage detection unit 163 included in the control unit 160A. In FIG. 6, the reset signal is cancelled when a voltage level reaches a threshold $V_{TL}$ at time t1 after power supply. In FIG. 6, the reset signal is a low active signal. When the voltage level drops under a threshold $V_{TH}$ at time t2, the voltage dropping detection signal is outputted. This voltage dropping detection signal is outputted until time t3 at when a voltage drops to the threshold voltage $V_{TL}$ where the reset signal turns to be active.

Figure 7:
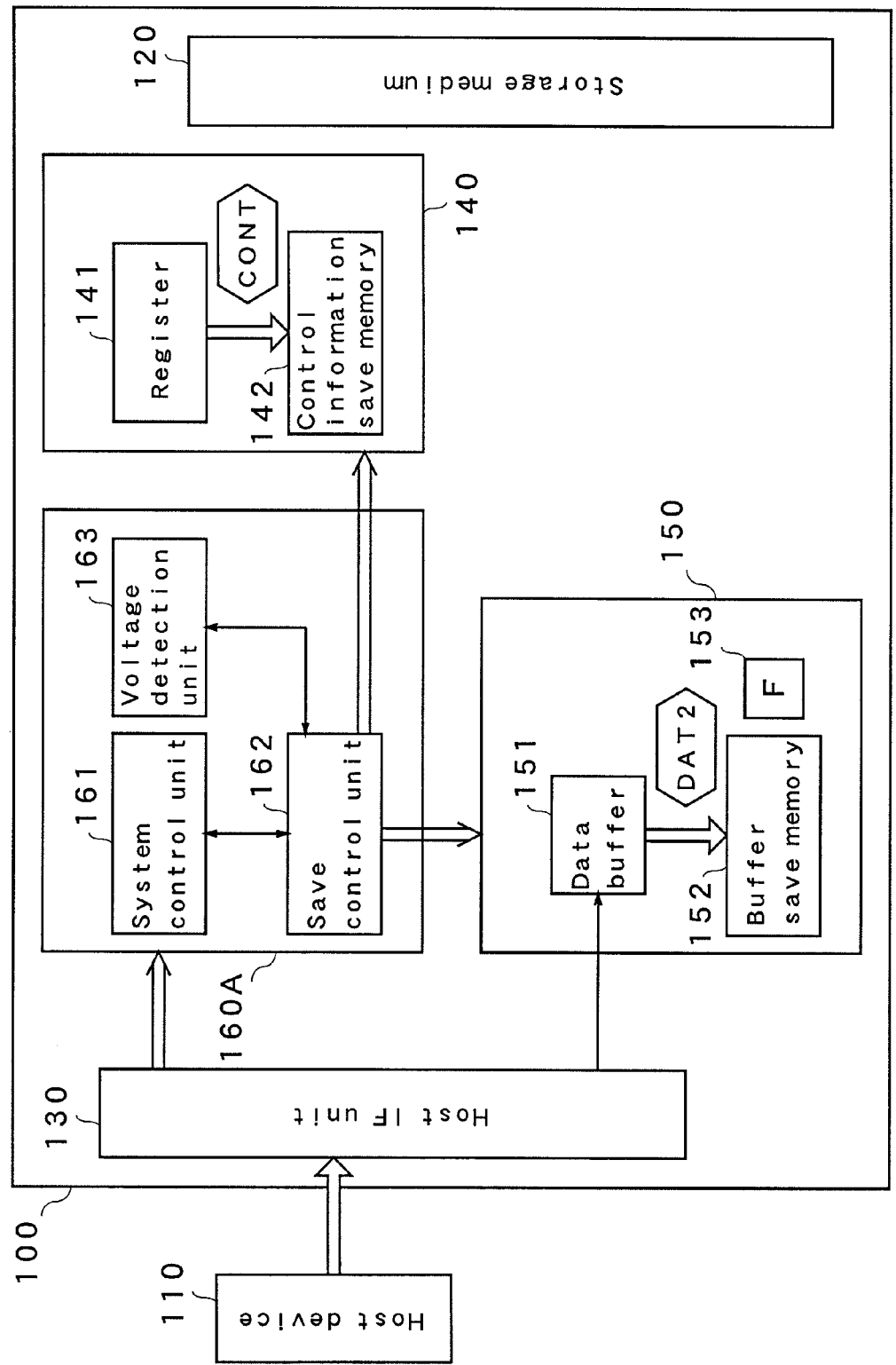
FIG. 7 is a block diagram to explain a flow at when voltage dropping is detected in the storage device according to the third embodiment of the present invention.

FIG. 7 shows an operation of a case where the voltage dropping detection signal is outputted from the voltage detection unit 163. The voltage detection unit 163 transmits a voltage detection signal to the save control unit 162. When receiving a voltage dropping detection signal during data writing, the save control unit 162 outputs a save signal to the control information retaining unit 140 and the buffer control unit 150 as shown in FIG. 7, similarly to the processing explained in FIG. 2D. The save control unit 162 outputs a save signal when an end command for writing is issued from the host device 110 and also when reaching a preliminarily transmitted size of writing data similar to the first and second embodiment. In the control information retaining unit 140, when receiving the save signal, the control information (CONT) such as the address and the writing block retained in the register 141 are saved into the control information save memory 142. When the buffer control unit 150 receives the save signal, the buffer control unit 150 saves the data DAT2 into the buffer save memory 152 when the data DAT2 stored in the data buffer 151 is in being written to the storage medium 120. Such processing is executed when the storage device 100 is accidentally removed during data writing in a case where the storage device 100 is removable and when the power supply is shut down by outward shock. In this case, the saved data is processed at the time when the power is supplied to the storage device 100. The processing is similar to the case shown in FIG. 4.

In this manner, data can be restored even when the power shut down occurs during writing. This embodiment is especially suitable for a hot-pluggable storage device, a potable device and a mobile phone in which the power shut down often occurs by the shock.

In respective embodiments mentioned above, the save flag is set when data is saved into the buffer save memory, however, the save flag may be set when the control information is saved into the control information save memory. In addition, the save flag may be set when data is saved into the buffer save memory and the control information is saved into the control information save memory. Furthermore, the buffer save memory and the control information save memory may use the same nonvolatile memory, and a part of the area in the nonvolatile memory may be set for the control information save, and the other parts of the area may be set for the buffer save. In this case, an area for the save memory may be further provided in the nonvolatile memory.

In respective embodiments mentioned above, the control information is retained in the control information save memory at the saving, however, the control information can be written into the storage medium by figuring out the control information from the storage medium in writing data, thus no control information save memory is necessary in this case.

INDUSTRIAL APPLICABILITY

According to the present invention, since a busy canceling to a host device can be executed in an early timing in normal data writing, an access efficiency for the host device can be improved. Accordingly, the storage device according to the present invention can be applied for various apparatuses using a storage device such as a memory card.

The invention claimed is:

1. A storage device, comprising:
   a storage medium composed of a nonvolatile flash memory for storing data;
   a buffer control unit including a data buffer for temporarily retaining data to be written transmitted from a host device and a nonvolatile buffer save memory for saving data of said data buffer;
   a control unit for controlling said buffer control unit; and
   a control information retaining unit for retaining control information including address information provided from the host device and information for writing data into said storage medium,
   wherein said control information retaining unit includes:
   a register for temporarily retaining the control information; and
   a nonvolatile control information save memory for saving information of said register, and
   wherein said control unit saves write data retained in said data buffer into said nonvolatile buffer save memory when the host device issues an end command of writing data,
   wherein said control unit saves the control information retained in said register into said nonvolatile control information save memory,
   wherein said control unit stores the write data in said storage medium based on information regarding the write data obtained from said host device, and
   wherein said control unit informs said host device of completion of writing after completion of saving the data.

2. The storage device according to claim 1,
   wherein the information regarding the write data obtained from said host device is information showing a termination of data writing.

3. The storage device according to claim 1,
   wherein the information regarding the write data obtained from said host device is information showing a preliminarily specified data size.

4. The storage device according to claim 1,
   wherein said control unit includes a voltage detection unit for detecting dropping of a power voltage, and
   wherein said control unit saves the write data retained in said data buffer into said nonvolatile buffer save memory when dropping of the power voltage is detected by said voltage detection unit during writing the write data transmitted from said host device into said storage medium.

5. The storage device according to claim 1,
   wherein said control information includes information of writing area address in said storage medium.

6. The storage device according to claim 1,
   wherein said nonvolatile control information save memory is a nonvolatile memory in which data can be written faster than said storage medium.

7. The storage device according to claim 6,
   wherein said nonvolatile control information save memory is composed of a ferroelectric memory.

8. The storage device according to claim 1,
   wherein said nonvolatile buffer save memory is a nonvolatile memory in which data can be written faster than said storage medium.

9. The storage device according to claim 8,
   wherein said nonvolatile buffer save memory is composed of a ferroelectric memory.

10. The storage device according to claim 1, further comprising:
    a nonvolatile save flag set when data is saved into said nonvolatile buffer save memory,
    wherein said control unit sets said save flag when data is saved into said nonvolatile buffer save memory, and clears the save flag when writing of said saved data into said storage medium is completed.

11. The storage device according to claim 10,
    wherein said control unit reads said save flag at the time when power is supplied, writes said write data retained in said data save buffer into said storage medium when said save flag is set, and clears said save flag when writing is completed.

12. The storage device according to claim 10,
    wherein said control unit reads said save flag at the time when power is supplied, confirms a size of data of writing data retained in said data save buffer when said save flag is set, writes the data into said storage medium in predetermined unit, and discards data retained in said data save buffer when a size of remaining writing data is less than a predetermined size.

13. The storage device according to claim 10,
    wherein said save flag is integrally configured with said nonvolatile buffer save memory.

14. The storage device according to claim 1, further comprising:
- a nonvolatile save flag set when information of said register is saved into the nonvolatile control information save memory,
- wherein said control unit sets said save flag when control information of the register is saved into said nonvolatile control information save memory, and clears the save flag when writing of data into said storage medium is completed with using said saved control information.

15. The storage device according to claim 1, further comprising:
- a nonvolatile save flag,
- wherein said control unit sets said save flag when data is saved into said nonvolatile buffer save memory and said control information is saved into said nonvolatile control information save memory, and
- wherein said control unit clears the save flag when writing of data into said storage medium is completed with using said saved control information.

16. The storage device according to claim 1,
- wherein said nonvolatile buffer save memory and said nonvolatile control information save memory are configured in the same nonvolatile memory,
- wherein data is saved into buffer save areas, and
- wherein the control information is saved into a control information save area, respectively.

* * * * *